United States Patent
Badarlis et al.

(10) Patent No.: US 10,613,045 B2
(45) Date of Patent: Apr. 7, 2020

(54) PROCESS OF DETERMINING AT LEAST ONE THERMAL PROPERTY OF A FLUID UNDER INVESTIGATION WITH A THERMAL SENSOR

(71) Applicant: Endress + Hauser Flowtec AG, Reinach (CH)

(72) Inventors: Anastasios Badarlis, Birsfelden (CH); Simon Stingelin, Zullwil (DE)

(73) Assignee: ENDRESS + HAUSER FLOWTEC AG, Reinach (CH)

(*) Notice: Subject to any disclaimer, the term of this patent is extended or adjusted under 35 U.S.C. 154(b) by 183 days.

(21) Appl. No.: 15/579,983

(22) PCT Filed: May 24, 2016

(86) PCT No.: PCT/EP2016/061649
§ 371 (c)(1),
(2) Date: Dec. 6, 2017

(87) PCT Pub. No.: WO2016/202538
PCT Pub. Date: Dec. 22, 2016

(65) Prior Publication Data
US 2018/0172610 A1    Jun. 21, 2018

(30) Foreign Application Priority Data
Jun. 19, 2015 (EP) ..................................... 15172915

(51) Int. Cl.
*G01N 25/20* (2006.01)
*G01K 15/00* (2006.01)
(Continued)

(52) U.S. Cl.
CPC ........... *G01N 25/18* (2013.01); *G01K 15/005* (2013.01); *G01K 17/00* (2013.01); *G01N 25/005* (2013.01)

(58) Field of Classification Search
USPC ................................. 374/43, 44, 1, 134, 166
See application file for complete search history.

(56) References Cited

U.S. PATENT DOCUMENTS 8,016,757 B2 *    9/2011    Kaczkowski .......... A61B 5/015
374/117

FOREIGN PATENT DOCUMENTS

CN    101587068 A    11/2009
CN    101799439 A    8/2010
(Continued)

OTHER PUBLICATIONS

Chinese Office Action in corresponding Chinese Application No. 201680034691.4, dated Apr. 25, 2019.
(Continued)

*Primary Examiner* — Mirellys Jagan
(74) *Attorney, Agent, or Firm* — Bacon & Thomas, PLLC

(57) ABSTRACT

A Process of determining at least one thermal property of a fluid under investigation with a thermal sensor. The thermal sensor has at least a first sensor element that is heated to provide heat to the fluid under investigation. The first or a second sensor that can sense the temperature of the fluid under investigation, wherein the process is characterized by the following steps: a) Providing a calibrated reduced order model which is calibrated with one or more thermal properties of at least a second and a third fluid; b) (Applying an amount of heat to the fluid under investigation by the first sensor element and) measuring the temperature $T_{sens}$ at the first and/or second sensor element said fluid under investigation; and c) Extracting one or more thermal property of the fluid under investigation by applying the said temperature $T_{sens}$ to said calibrated reduced order model.

10 Claims, 3 Drawing Sheets

(51) Int. Cl.
*G01K 13/00* (2006.01)
*G01K 7/00* (2006.01)
*G01N 25/18* (2006.01)
*G01K 17/00* (2006.01)
*G01N 25/00* (2006.01)

(56) References Cited

FOREIGN PATENT DOCUMENTS

| | | |
|---|---|---|
| CN | 103336021 A | 10/2013 |
| EP | 3 106 851 A1 | 12/2016 |
| WO | 2015/074833 A1 | 5/2015 |

OTHER PUBLICATIONS

European Search Report, European PTO, Munich, dated Sep. 14, 2015.
International Search Report, EPO, The Netherlands, dated Jul. 27, 2016.
T. Bechtold et al., "Efficient Extraction of Thin Film Thermal Properties via Parametric Model Order Reduction and Optimization", Solid-State Sensors, Actuator and Microsystems Conference, Transducers, Jun. 21, 2009, pp. 2437-2440.

* cited by examiner

PROCESS OF DETERMINING AT LEAST ONE THERMAL PROPERTY OF A FLUID UNDER INVESTIGATION WITH A THERMAL SENSOR

TECHNICAL FIELD

The current invention relates to a Process of determining at least one thermal property of a fluid under investigation with a thermal sensor and to a thermal sensor.

BACKGROUND DISCUSSION

Sensors that can determine thermal quantities such as the thermal conductivity belong already to the state of the art. Most of them determine the thermal properties with the help of analytical models or equivalent electrical circuit thermal models. This is described for example by J. Kuntner, F. Kohl, and B. Jakoby, "Simultaneous thermal conductivity and diffusivity sensing in liquids using a micromachined device," Sensors Actuators, A Phys., vol. 130-131, no. SPEC. ISS., pp. 62-67, August 2006.

Reduced order models were so far used for different reasons. Different reduced order model methods have been developed and a classification of them was made by T. Antoulas, "Model reduction of large-scale systems Lecture I: Overview Balanced truncation Krylov methods Moment matching," 2008.

They can be classified in two main categories, these are the Krylov-based methods and the SVD-based (Singular Value Decomposition) methods. The reduction process starts with the finite element method (FEM) model that is a high order model and needs high computational effort. This is the advantage of a reduced order model (ROM) against the high order model (FEM model), as ROM can be solved much faster than the high order model, due to its significantly lower dimensions.

The reduced order modeling methods are mainly used for system simulation, control and design. One significant application fields constitutes the structural dynamics. Reduced order modeling approach for thermals system has been presented by C. Moosmann, E. B. Rudnyi, A. Greiner, and J. G. Korvink, "Model Order Reduction for Linear Convective Thermal Flow," no. April, pp. 1-9, 2004 for the simulation of a micro thermal flow meter.

In addition, U. Baur, P. Benner, A. Greiner, J. Korvink, J. Lienemann, and C. Moosmann, "Parameter pre-serving model order reduction for MEMS applications," Mathematical and Computer Modeling of Dynamical Systems, vol. 17, pp. 297-317, August 2011 also used parametric reduced order model for micro-thermal flow meter.

SUMMARY OF THE INVENTION

Starting from the aforementioned processes of determining the thermal properties with the help of analytical models or equivalent electrical circuit thermal models it is the object of the current invention to determine the thermal property or properties more accurately.

This object is achieved with a process of determining at least one thermal property of a fluid under investigation with a thermal sensor by using a calibrated reduced order model (ROM), wherein the thermal sensor has at least a first sensor element that is heated to provide heat to the fluid under investigation; the first or a second sensor element that can sense the temperature of the fluid under investigation; wherein the process is characterized by the following steps a) Providing a calibrated reduced order model which is calibrated with one or more thermal properties of at least a second fluid;

b) Applying an amount of heat to the fluid under investigation by the first sensor element and measuring the temperature $T_{sens}$ of said fluid under investigation at the first and/or second sensor element;

c) Extracting one or more thermal property of the fluid under investigation by applying the said temperature $T_{sens}$ to said calibrated reduced order model.

The process can be applied as a computer program product in a processing unit of a computer. However, most preferably it can be applied in an evaluation unit of a thermal sensor, for example in a transducer, since the process represents a very efficient and precise method for determining the thermal properties of a fluid, which is called herein fluid under investigation.

Further advantageous embodiments are subject-matter of the sub-claims.

It is of advantage if the step of providing a calibrated reduced order model according to step a) comprises the step of a1) Provide set of data representing a 3D-model of the sensor.

It is of advantage if the step of providing a calibrated reduced order model according to step a) comprises the step of a2) comprises an adaptation of the set of data of the 3D-model to a reduced order model.

It is of advantage if the step of providing a calibrated reduced order model includes a generation of a reduced order model from the 3D model of the sensor by applying one model order reduction method.

The step of providing a calibrated reduced order model can comprise steps that are applied before the start of the process of determining at least one thermal property, as a pre-conditioning of the sensor.

It is of advantage if the reduced order model is a Proper Orthogonal Decomposition Model.

It is of advantage if the thermal sensor operates with an harmonic excitation and that the reduced order model is fitted according to the following equation:

$$\min\|T_{sens,model} - T_{sens,measured}\|^2$$

,wherein the measured amplitude and the measured phase of $T_{sens,measured}$ detected by the first or second sensor element, are the entry values for the aforementioned equation, while the output values of the aforementioned equation are the thermal properties, preferably the thermal conductivity and/or the volumetric heat capacity, or values that correspond to these values.

Alternatively the thermal sensor can operate in the same way with the 3-omega method or transient method instead of the harmonic excitation. The fitting can be done in the same way as described before.

It is of advantage if the thermal sensor determines both, the thermal conductivity (k) and the volumetric heat capacity ($\rho c_p$) of the fluid under investigation.

According to the invention a thermal sensor for determining at least one thermal property of a fluid under investigation, has at least a first sensor element that is heated to provide heat to the fluid under investigation; the first or a second sensor element that can sense the temperature of the fluid under investigation; wherein the thermal sensor comprises an evaluation unit that is adapted to determine at least one thermal property according to the process of one of the preceding claims.

BRIEF DESCRIPTION OF THE DRAWINGS

Hereinafter the invention is explained more in detail with some drawings

DETAILED DISCUSSION IN CONJUNCTION WITH THE DRAWINGS

The current invention relates to a process for the determination of at least one thermal property by thermal sensor. The thermal sensor is for example able to determine the thermal conductivity (k), the volumetric heat capacity ($\rho c_p$) and/or the thermal diffusivity (a).

It is known in the art that sensor has a model for the calculated of the end physical quantity from the direct measured quantity. An example of an analytical model which is already known in the art for a thermal sensor which consist of a hot wire sensor element can be found in E. Yusibani and P. Woodfield, "A procedure for application of the three-omega method to measurement of gas thermal conductivity," Journal of Thermal Science and Technology, vol. 4, no. 1, pp. 146-158, 2009.

In the case of said thermal property sensor the direct measured quantity is the temperature of the temperature sensors, which is derived from the measured resistance or the measured voltage by sensor elements of the thermal property sensor. However, if there is no 1-1 (monotonic) relation between the direct measured quantity and the end measured quantity, respectively the desired properties, normal models often fail.

In the case of a thermal property sensor this non-monotonic behavior could be observed for the end measured quantities, which are the desired thermal properties, such as k and $\rho c_p$. The direct measured quantities, that means the temperatures, are coupled with both of the thermal properties (k, $\rho c_p$) and the real physical behavior cannot be described accurately with an analytical modelling approach or with an equivalent electrical circuit thermal model approach.

The current invention proposes the use of a parametric reduced order model for the determination of the desired property values in a thermal property sensor, especially in a transmitter of such a thermal property sensor. This model can provide a far more accurate calculation of the end quantity, respectively the desired properties, such as k and $\rho c_p$, as the model can take into consideration and compensate effects that cannot be modeled by an analytical model.

Common modern mathematical models of real-life processes used in numerical simulations are often complex and have a large size dimension and need therefore a computing capacity. Compared to these models, a reduced order model has lower the computational complexity of such problems, for example, in simulations of large-scale dynamical systems and control systems. By a reduction of the model's associated state space dimension or degrees of freedom, an approximation to the original model is computed. This reduced order model (ROM) can then be evaluated with slightly lower accuracy but in significantly less time.

Figure 4:
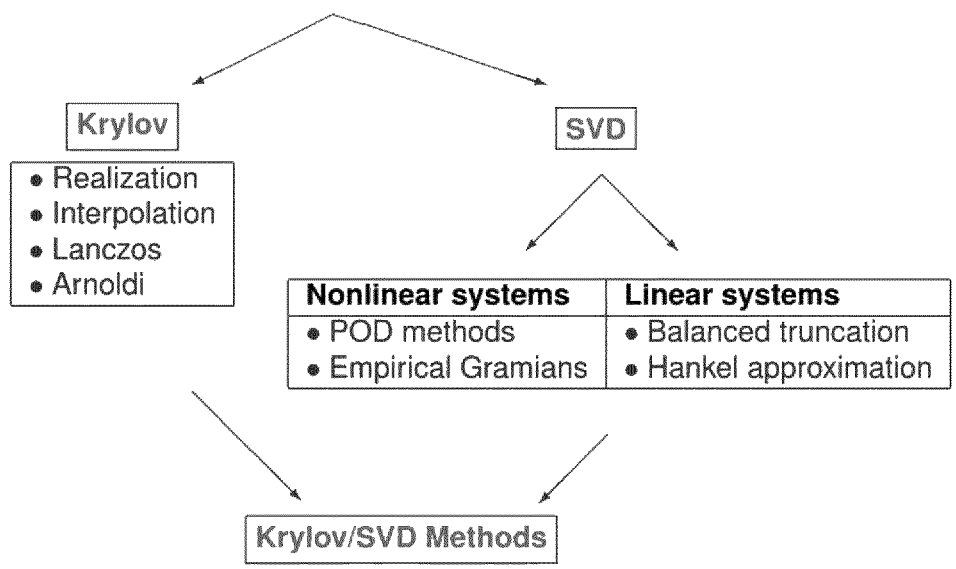
FIG. 4 is a ROM-classes according to the state of the art.

An approach for model order reduction is projection-based reduction. The following methods were comprised in this class:
Proper Orthogonal Decomposition (POD-Model); Balanced Truncation; Approximate Balancing; Reduced Basis Method; Matrix Interpolation; Transfer Function Interpolation; Piecewise Tangential Interpolation; Loewner Framework and (Empirical) Cross Gramian. Some more reduced order models are classified in FIG. 4.

In general all these methods can be applied for the modelling of a thermal property sensor and for the determination of the desired properties.

The reduced order model has very low dimensions. In the current case a reduced order model with a matrices with dimensions lower than 30×30 can been used. Models of this size can be handled by embedded system micro-processors which are present in the transmitter of said thermal property sensor.

Usually a parametric reduced order model (ROM) is extracted from a respective finite element method (FEM) model and is used for the calculation of the system response, this is the direct or forward problem.

Figure 1:
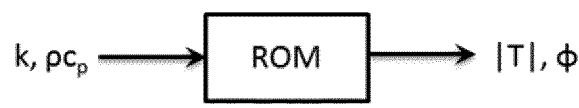
FIG. 1 is a direct parametric ROM-approach (not part of the invention)

In FIG. 1 the direct parametric reduced order modelling approach is shown. As it is presented in FIG. 1, for a thermal sensor with harmonic excitation (temperature oscillating technique), the two input parameters are the thermal conductivity (k) and the volumetric heat capacity ($\rho c_p$), solving the reduced order model for specific values of the parameters, the temperature amplitude and phase of the temperature sensor can be calculated. The volumetric heat capacity is the product between the density and the specific heat capacity ($\rho c_p$).

For the better understating, the parametric reduced order model is a numerical model in form of matrices and/or the matrices have coefficients which consists of the parameters of the system. In other words, is a system of equations of Ordinary Differential Equations (ODEs) or Algebraic Equations (AEs) in matrix form. The system is the combination of the sensor, including sensor geometrics, and the fluid.

Although the parametric reduced order modelling approach has been used for parametric analysis of sensors and their optimization, no use of the parametric reduced order model in the inverse problem has been found in literature for applications of fluid thermal property sensors. Therefore the use of a reduced order model by an evaluation unit of a thermal property sensor for the determination of said properties is so far not known in the art. Especially the reduced order modeling can be used in a sensor which is fully described in WO2015/074833 A1. Reference is made to the construction of the sensors disclosed therein, which can be also applied for a thermal property sensor in the context with the current invention.

Figure 2:
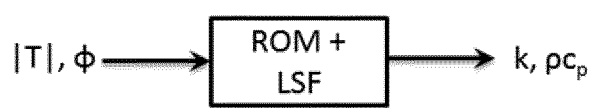
FIG. 2 is an inverse paramentric ROM-approach.

The proposed approach of the current invention can preferably but not exclusively be applied for a sensor under harmonic excitation (temperature oscillating technique) and can be summarized in the diagram of FIG. 2.

In case of a thermal sensor with harmonic excitation (temperature oscillating technique), the amplitude and the phase on the temperature sensor are measured and then the model is fitted according to equation (1), cited below, on the measured value of temperature T=|T|$e^{i\varphi}$ with parameters of the thermal fluid properties, especially k and $\rho c_p$. We have to mention here that the parametric reduced order model has to be calibrated first in known fluid, where k, $\rho c_p$ are known.

$$\min \|T_{sens,model} - T_{sens,measured}\|^2 \qquad (1)$$

FIG. 2 shows schematically an inverse parametric reduced order modelling (ROM) approach for a sensor with harmonic excitation (temperature oscillating technique). A least square fitting algorithm or another approach can be used complementary.

Another option for the extraction of thermal properties (k, $\rho c_p$) from the reduced order model avoiding a fitting algorithm would be the pre-calculation of an amplitude and a phase for all of the values of thermal conductivity (k) and volumetric heat capacity ($\rho c_p$). Then during the measurement process the combination of measured temperature amplitude and phase |T|, $\varphi$ provides the combination of the thermal properties k and $\rho c_p$. A graphical presentation of this approach is given in FIG. 3, where the cross point of amplitude |T| and phase $\varphi$ iso-curves is used for the extraction of the thermal conductivity and the volumetric heat capacity of the fluid.

Applicability of the method is possible in every thermal property sensor independent of the measurement principle that it uses. For example temperature oscillating technique, transient method, 3ω, steady state (only thermal conductivity measurement).

Different parametric reduced order modelling techniques can be used for the modelling of a fluid thermal sensor. For example, Reduced Basis method, Krylov-Sub-Space methods, Truncated Balanced Realization and the Proper Orthogonal Decomposition (POD) and other. However the POD-model is the preferred modeling technique.

Figure 3:
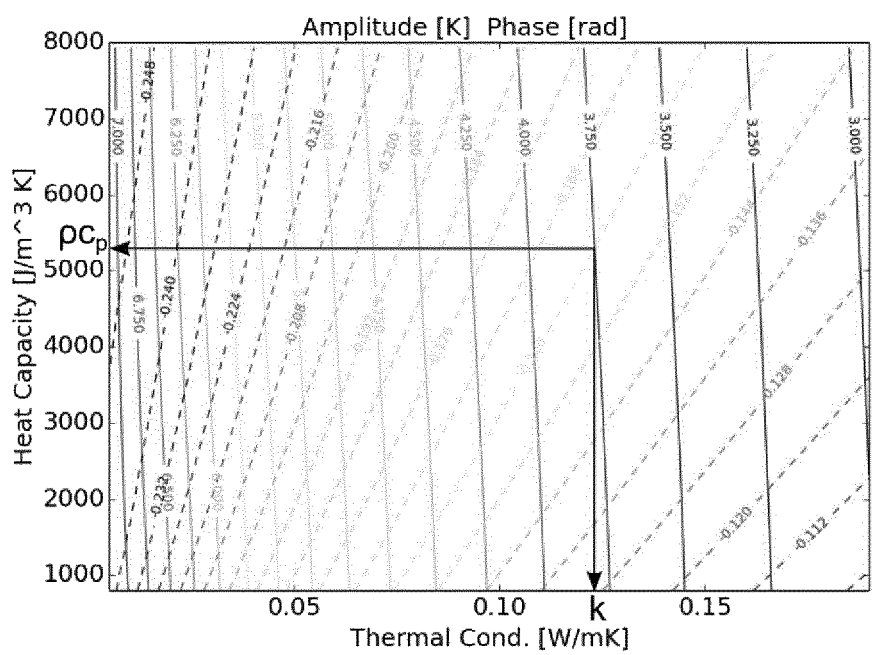
FIG. 3 is a graphical representation of the thermal conductivity and volumetric heat capacity calculation.

FIG. 3 shows a graphical representation of thermal conductivity and volumetric heat capacity calculation from the measured amplitude and phase. Amplitude solid lines and phase dashed lines. The cross point of the iso-curves corresponds to the thermal properties k,$\rho c_p$.

For the further explanation of the use of a parametric reduced order model according to the invention a preferred embodiment is described by the following example:

In the following analysis the thermal property sensor operates using the temperature oscillating technique (harmonic excitation). The thermal property sensor consists of a heater, as a first sensor element, which operates using a harmonic excitation $$\dot{Q} = |\dot{Q}|e^{i\omega t} \, [W/m^3],$$

wherein $\dot{Q}$ is defined as Energy generation in the volume of the heater
$|\dot{Q}|$ is defined as Amplitude of the Energy generation
$e^{i\omega t}$ is defined as exponential form of an harmonic excitation
and a temperature sensor, as a second sensor element. The heater and the temperature sensor can also be included in only one first sensor element, which is can operate between two operation modes, a heating mode and a temperature sensing mode.

The temperature on the temperature sensor $$T_{sens} = |T_{sens}|e^{i\omega t + \varphi},$$

wherein
$T_{sens}$ is the temperature by the temperature sensor element of the thermal property sensor in a fluid;
$|T_{sens}|$ is the amplitude of the aforementioned measured temperature $T_{sens}$; and
$e^{i\omega t + \varphi}$ is the exponential form of the harmonic response of the temperature of the sensor including the phase ($\varphi$).

Figure 5:
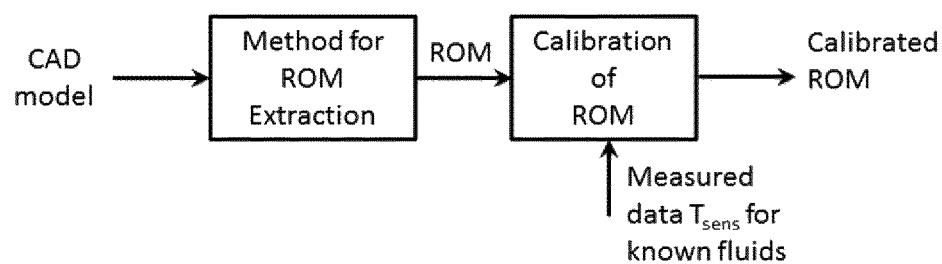
FIG. 5 is a parametric ROM extraction process for receiving a calibrated ROM.

In FIG. 5 a parametric reduced order model extraction process according to an advantageous embodiment is shown. In FIG. 5 the parametric reduced order model extraction process is described. The process begins with a 3D CAD model of the sensor. The parametric reduced order model (ROM) is extracted following one of the reduced order model methods. The extracted reduced order model is parametrised and a simple form can be seen in equation 2 and 3. As can be seen in these equations the fluid thermal properties, which are scalar quantities, are parameter of fluid matrices. It could be a gas or a liquid. The $K_{r,fluid}$ and $Mr_{r,fluid}$ are the fluid matrices with dimensions $N_r \times N_r$ extracted from the ROM. Similarly, the $K_{solid}$ and $M_{solid}$ are the matrices which correspond to sensor (solid part) of the domain which are extracted from the ROM. In a more general frame, we can say that these matrices contain the information of the fluid and solid domains respectively. The vector $\dot{Q}_r(N_r \times 1)$ corresponds to the energy generation in the domain, while the vector $N_{r,sens}$ ($N_r \times 1$) corresponds to the domain of the temperature sensor and is used for the calculation of the averaged temperature. Finally, $T_r$ is the state variable vector (temperature vector). The temperature in the temperature sensor can be calculated from equation 3.

$$k_{fluid}K_{r,fluid}T_r + K_{r,solid}T_r + i\omega(\rho c_p)_{fluid}M_{r,fluid}T_r + i\omega M_{r,solid}T_r = \dot{Q}_r \quad (2)$$

$$T_{sens} = N_{r,sens}{}^H T_r \quad (3)$$

$N_{r,sens}{}^H$ is the conjugated transposed vector of $N_{r,sens}$.

The second step of the ROM extraction is, according to FIG. 5, the calibration of the parametric reduced order model. The reduce order model can also be calibrated by adding calibration factors in equation 2 and 3. This can eliminate any discrepancies between the model and the real sensor response. During the calibration process the calibration parameters extracted by fitting the model to measured data of a fluid with known properties.

Finally, this calibrated parametric reduced order model can be used inversely for the calculation of the thermal properties (k,$\rho c_p$) from the direct measured quantities, the temperature of the temperature sensor ($T_{sens}$) or sensors in the current case.

According to the current invention it is proposed the use of a parametric reduced order model as a replacement of the analytical models or the equivalent electrical circuit thermal models, which has been used so far in a fluid thermal property sensors with scope the calculation of fluid thermal properties, especially the thermal conductivity and/or the thermal diffusivity as well as the volumetric heat capacity. The reduced order models have low dimensions, which reduces significantly the computation effort. For the extraction of the parametric reduced order model any reduction method, which is applicable in this field can be used, but the parametric POD-model is preferred among the other models.

As mentioned before proposed invention can be used for thermal property sensor independent of the working principle. For example, temperature oscillation technique, 3ω method, steady state method, transient method and other. The said invention could also be used in other thermal sensors.

Figure 6:
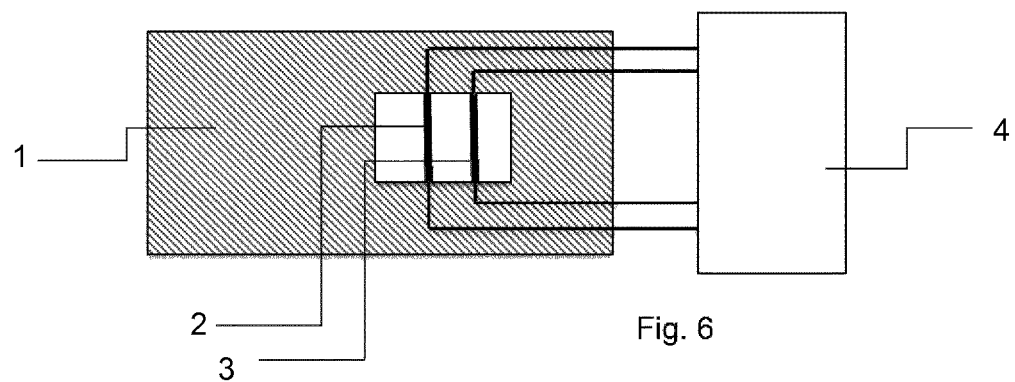
FIG. 6 is a schematical presentation of a thermal sensor.

A simplified thermal sensor 1 is shown in FIG. 6. This sensor has a first and a second sensor element 2 and 3, which are arranged in a free space of the sensor. The first sensor element 2 provides heat to a fluid of investigation with unknown properties which surrounds the sensor element, displayed in the plan view of FIG. 6. The second sensor element 3 can measure the temperature of the sensor, including an amplitude and a phase. The measured signals are transferred to an evaluation unit 4, having a microprocessor and a data storage unit. The evaluation unit (4) is adapted to use the reduced order model to determine the thermal properties of the fluid under investigation.

The invention claimed is:

1. A process of determining at least one thermal property of a fluid under investigation with a thermal sensor by using a calibrated reduced order model, the thermal sensor having at least a first sensor element that is heated to provide heat to the fluid under investigation, wherein the first or a second sensor element can sense the temperature of the fluid under investigation, wherein the process comprises the following steps:
   a) providing a calibrated reduced order model which is calibrated with one or more thermal properties of at least a second and a third fluid;
   b) applying an amount of heat to the fluid under investigation using the first sensor element, and measuring the temperature at the first and/or second sensor element of said fluid under investigation; and
   c) extracting one or more thermal properties of the fluid under investigation by applying the said temperature to said calibrated reduced order model.

2. The process according to claim 1, wherein:
the step of providing a calibrated reduced order model includes a generation of a reduced order model from a 3D model of the sensor by applying one model order reduction method.

3. The process according to claim 1, wherein:
the step of providing a calibrated reduced order model comprises steps that are applied before the start of the process of extracting at least one thermal property.

4. The process according to claim 1, wherein:
the reduced order model is a Proper Orthogonal Decomposition Model.

5. The process according to claim 1, wherein:
the thermal sensor operates with a harmonic excitation, and the reduced order model is fitted according to the following equation:

$$\min\|T_{sens,model} - T_{sens,measured}\|^2,$$

wherein a measured amplitude and a measured phase of $T_{sens,measured}$ measured by the first or second sensor element, are the entry values for the aforementioned equation, while the output values of the aforementioned equation are thermal properties,
wherein $T_{sens,model}$ is provided by the calibrated reduced order model.

6. The process according to claim 1, wherein:
the thermal sensor operates with a 3-omega method or transient method instead of a harmonic excitation.

7. The process according to claim 1, wherein:
the thermal sensor determines a thermal conductivity and a volumetric heat capacity of the fluid under investigation.

8. The process according to claim 1, wherein:
the step of providing a calibrated reduced order model according to step a) comprises the step of:
   a1) providing a set of data representing a 3D-model of the thermal sensor.

9. The process according to claim 8, wherein:
the step of providing a calibrated reduced order model according to step a) comprises the step of:
   a2) comprising the adaptation of the set of data of the 3D-model to a reduced order model.

10. A thermal sensor for determining at least one thermal property of a fluid under investigation, having at least:
a first sensor element that is heated to provide heat to the fluid under investigation, wherein said first or a second sensor can sense the temperature of the fluid under investigation; and
an evaluation unit that is adapted to determine at least one thermal property according to claim 1.

* * * * *